United States Patent [19]
Nomura et al.

[11] Patent Number: 5,606,394
[45] Date of Patent: Feb. 25, 1997

[54] CLEANING STRUCTURE FOR OUT-OF-LIQUID CONVEYING PORTION

[75] Inventors: Kouki Nomura, Aichi-ken; Hiroyuki Satoh, Kanagawa, both of Japan

[73] Assignee: Fuji Photo Film Co., Ltd., Kanagawa, Japan

[21] Appl. No.: 648,444

[22] Filed: May 15, 1996

Related U.S. Application Data

[62] Division of Ser. No. 483,270, Jun. 7, 1995, Pat. No. 5,555,072.

[30]  Foreign Application Priority Data

Sep. 5, 1994  [JP]  Japan .................................. 6-211305
Sep. 5, 1994  [JP]  Japan .................................. 6-211306
Sep. 5, 1994  [JP]  Japan .................................. 6-211308

[51] Int. Cl.[6] .......................... G03B 27/32; G03B 13/08; G03B 27/52; G03B 29/00
[52] U.S. Cl. ......................... 355/27; 355/28; 396/619; 396/626; 396/627
[58] Field of Search ....................... 355/27, 28, 30; 354/301, 302, 303, 305, 312, 316, 319, 320, 324, 325

[56]  References Cited

U.S. PATENT DOCUMENTS

| | | | |
|---|---|---|---|
| 4,405,227 | 9/1983 | Inoue et al. ............................. | 355/27 |
| 4,727,394 | 2/1988 | Bov, Jr. et al. ........................ | 355/3 |
| 4,731,631 | 3/1988 | Monkelbann et al. .................. | 355/3 |
| 5,307,107 | 4/1994 | Nozawa et al. ........................ | 354/324 |
| 5,379,085 | 1/1995 | Matsuda et al. ....................... | 354/319 |
| 5,394,216 | 2/1995 | Suzuki et al. .......................... | 354/324 |

*Primary Examiner*—Arthur T. Grimley
*Assistant Examiner*—Herbert Kerner
*Attorney, Agent, or Firm*—Sughrue, Mion, Zinn, Macpeak & Seas

[57]  ABSTRACT

A cleaning structure for an out-of-liquid conveying portion whose object is to facilitate detachment and attachment of a cleaning nozzle unit from and to a crossover rack, and to hold cleaning nozzles in predetermined positions suitable for the out-of-liquid conveying portion in a state in which the cleaning nozzle unit has been mounted to the crossover rack. In order to mount the cleaning nozzle unit to the crossover rack, the cleaning nozzles are made to penetrate through through-holes defined in one of side walls of the crossover rack. In this state, an interlocking member is elastically flexed so as to be inserted into an interlocking hole. After completion of its insertion of the interlocking member, a hook is brought into engagement with an upper edge of the interlocking hole by elastic recovery of the interlocking member. As a result, a case can be mounted to the side wall.

2 Claims, 9 Drawing Sheets

CLEANING STRUCTURE FOR OUT-OF-LIQUID CONVEYING PORTION

This is a divisional of application Ser. No. 08/483,270 filed Jun. 7, 1995, now U.S. Pat. No. 5,555,072.

BACKGROUND OF THE INVENTION

1. Field of the Invention

The present invention relates to an out-of-liquid conveying portion cleaning structure for cleaning an out-of-liquid conveying portion of a crossover rack mounted to an upper portion of a processing rack for feeding, for example, a printed photosensitive material into a processing solution and processing the photosensitive material therein.

2. Description of the Related Art

In a conventional printer-processor, photographic paper is exposed and printed by a printer unit. After the photographic paper has been printed, the photographic paper is subjected to respective processes such as development, bleaching/fixing and washing, followed by drying in a drying unit, after which the so-processed photographic paper is discharged to a stock unit.

The respective processes such as development, bleaching/fixing and washing are respectively performed by a developing bath, a bleaching/fixing bath and washing baths. Each of the processing baths has a processing rack for feeding photographic paper into a processing solution.

A crossover rack provided, at an out-of-liquid area, with an out-of-liquid conveying portion comprised of rollers for introducing photographic paper into a solution or withdrawing the photographic paper from the solution for the purpose of executing other processes, guides, etc., is provided at an upper portion of each processing rack. A small amount of processing solution adheres to the out-of-liquid conveying portion upon conveyance of the photographic paper. If development processing is stopped while the processing solution remains adhered and driving is ceased for a long time during the night or the like, the processing solution adheres to and remains at the out-of-liquid conveying portion when the following developing processing is started. As a result, the processing solution is often transferred onto the initial photographic paper at the time of commencement of the development processing as smudges.

In order to avoid the occurrence of such smudges, the crossover rack is detached from the processing rack upon completion of the development processing. It is then necessary to clean the out-of-liquid conveying portion and remove the processing solution adhered to the out-of-liquid conveying portion. The out-of-liquid conveying portion must be mounted to the crossover rack again after completion of cleaning.

Therefore, an automatic cleaning or flushing device is considered which is capable of automatically cleaning an out-of-liquid conveying portion without detaching the out-of-liquid conveying portion.

Namely, a cleaning nozzle unit is mounted to a crossover rack and cleaning water is sprayed onto the out-of-liquid conveying portion through cleaning nozzles for a predetermined time. Thereafter, rollers are rotated for a predetermined time. Further, washing water is sprayed on the out-of-liquid conveying portion for a given time, after which the rollers are reversed for a predetermined time. This processing is repeated several times, in order to perform the cleaning.

When it is desired to maintain and inspect the cleaning nozzles, or the crossover rack and the processing rack, it is necessary to detach the cleaning nozzle unit from the crossover rack.

It is thus necessary to easily attach and detach the cleaning nozzle unit to and from the crossover rack. It is also necessary to hold the cleaning nozzles in predetermined positions suitable for the out-of-liquid conveying unit in a state in which the cleaning nozzle unit has been attached to the crossover rack.

With the foregoing in view, it is therefore a first object of the present invention to provide a cleaning nozzle unit suitable for use in an out-of-liquid conveying portion, which is capable of facilitating attachment and detachment of the cleaning nozzle unit to and from a crossover rack and holding cleaning nozzles in predetermined positions suitable for the out-of-liquid conveying portion.

Further, when attempts are made to maintain and check the cleaning nozzles, it is necessary to separate the piping between the cleaning nozzles and a washing water supply source. When the crossover rack is attached to the moving rack and detached therefrom to maintain and inspect the out-of-liquid conveying portion, it is often necessary to separate the piping between the cleaning nozzles and the washing water supply source so as to avoid the occurrence of trouble upon attachment and detachment of the crossover rack to and from the processing rack. It is preferable to provide an easily separable/connectable connecting structure.

On the other hand, the connection of the piping between the cleaning nozzles and the washing water supply source requires liquid-tightness capable of being resistant to corresponding pressure.

However, it can readily be imagined that when guaranteed fluid-tightness is obtained, it can readily be imagined that the separation and connection between the cleaning nozzles and the washing water supply source should become difficult.

With the foregoing in view, it is therefore a second object of the present invention to provide a connecting structure for a piping, which is capable of ensuring fluid-tightness when the piping is connected, and which is capabled of providing easy separation and connection.

It is also necessary to accurately verify the quantity of cleaning water delivered from the cleaning nozzles in order to hold the concentration of the processing solution constant.

The concentration of a processing solution such as a developer, a bleaching/fixing solution or the like varies depending on the evaporation of water. In order to maintain the concentration of the processing solution at a constant level, it is necessary to replenish water of a quantity corresponding to the quantity of evaporated water. It is considered that water used when the out-of-liquid conveying portion is cleaned, is replenished as the water to be replenished, i.e., the cleaning water is used to compensate for evaporation. In this case, the quantity of the cleaning water discharged from the cleaning nozzles must be accurately verified. It is however undesirable that the structure becomes complex and operation becomes cumbersome.

With the foregoing in view, it is therefore a third object of the present invention to provide a method of measuring the quantity of cleaning water, which is capable of accurately and easily verifying the quantity of cleaning water delivered from cleaning nozzles, and to provide a measuring rack using this method.

SUMMARY OF THE INVENTION

According to a first aspect of the present invention, there is provided a cleaning nozzle unit suitable for use in an out-of-liquid conveying portion, said cleaning nozzle unit is mounted to a crossover rack provided at an upper portion of a processing rack provided within a processing bath containing therein a processing solution for processing a photosensitive material which has been subjected to printing, said processing rack conveying the photosensitive material into the processing solution and processing the photosensitive material in the processing solution, said crossover rack accommodating the out-of-liquid conveying portion including out-of-liquid rollers for conveying the photosensitive material in an out-of-liquid area, said cleaning nozzle unit cleaning the out-of-liquid conveying portion, and comprising:

a case opposed to one of side walls between which the out-of-liquid rollers are mounted and which are opposed to end surfaces of the out-of-liquid rollers, said case having a cavity defined therein;

a connecting portion provided at said case and communicating with an interior of said case, said connecting portion being connected to piping for supplying cleaning water to the interior of said case;

a plurality of cleaning nozzles projecting from an outer surface of said case, which outer surface is provided on a side opposite to said one side wall, said plurality of cleaning nozzles communicating with the interior of said case, and extending through corresponding through-holes formed in said one side wall so as to enter the crossover rack, and discharging the cleaning water to the crossover rack; and an interlocking/non-interlocking portion projecting from the outer surface of said case and elastically and engageably fit in an interlocking portion formed in said one side wall in a state in which said cleaning nozzles penetrate into the corresponding through-holes, thereby mounting said case on said one side wall.

In accordance with to the above construction, the cleaning nozzle unit is mounted to the crossover rack by causing the cleaning nozzles to penetrate the through-holes defined in the side wall of the crossover rack and elastically fitting the interlocking/non-interlocking portion in the interlocking portion in the state in which the cleaning nozzles extend through the through-holes. Thus, the case can be attached to the side wall of the crossover rack. In the state in which the cleaning nozzle unit has been mounted to the crossover rack, the out-of-liquid conveying portion, i.e., the rollers located in the out-of-liquid area, guides, and the like can be cleaned by discharging the cleaning water from the cleaning nozzles.

In order to remove the cleaning nozzle unit from the crossover rack for the purpose of maintaining and inspecting the cleaning nozzles or maintaining and inspecting the crossover rack and the processing rack, for example, the interlocking/non-interlocking portion may be released from the interlocking portion and the cleaning nozzles may be withdrawn from the through-holes defined in the side wall.

Thus, the cleaning nozzle unit can be easily attached to and detached from the crossover rack. In the state in which the cleaning nozzle unit has been mounted to the crossover rack, the cleaning nozzles extend through the through-holes and are held in predetermined positions suitable for the out-of-liquid conveying portion.

A processing solution attached to the out-of-liquid conveying portion is removed under the cleaning action of the cleaning nozzles. When development processing operation is stopped while the processing solution adheres to and remains at the out-of-liquid conveying portion and the following development processing is started, for example, the attached processing solution can be prevented from being transferred onto photographic paper as smudges.

This cleaning can be automatically performed without removing the out-of-liquid conveying portion from the crossover rack.

In accordance with a second aspect of the present invention, there is provided a connecting structure for a piping into which a fluid is fed under pressure, comprising a connecting pipe including:

a cylindrical body having one end which is open and another end which is closed;

a plunging cylindrical portion provided so as to plunge into said cylindrical body coaxially with said cylindrical body at the other end of said cylindrical body, said plunging cylindrical portion having a plunging leading end which opens to an interior of said cylindrical body and another end which opens to an exterior of said cylindrical body; and a connecting portion provided on the downstream side, said connecting portion being formed outside said cylindrical body at the other end of said cylindrical body and being conected to a piping provided on the downstream side, so as to communicate with an open other end of said plunging cylindrical portion;

a seal pipe which is elastically deformable and shaped in the form of a cylinder whose both ends are open, said seal pipe having a connecting portion provided on the downstream side, which is formed at one open end of said seal pipe and is coupled to a piping provided on the downstream side, said seal pipe passing through the open one end of said cylindrical body and being inserted into and withdrawn from said cylindrical body coaxially with said cylindrical body, and said seal pipe having an open other end fitting on the outer periphery of said plunging cylindrical body when said seal pipe is inserted, and said seal pipe having expansion portion each increasing in diameter when an internal pressure is applied to a peripheral portion thereof, to thereby press an inner periphery of said cylindrical body under pressure.

In accordance with to the construction of the second aspect of the present invention, the open other end of the plunging cylindrical portion can extend outwardly from the cylindrical body and an end of the formed extension can serve as the connecting portion provided on the upstream side, which is coupled to the piping on the upstream side.

The connecting structure for the piping in accordance with the second aspect of the present invention can be attached to a crossover rack having an out-of-liquid conveying portion for conveying a photosensitive material in an out-of-liquid area, which is provided at an upper portion of a processing rack disposed within a processing bath for processing a printed photosensitive material, so as to convey the photosensitive material into a processing solution. Further, the connecting structure can be used between cleaning nozzles for cleaning the out-of-liquid conveying portion and a washing water supply source for supplying cleaning water to the cleaning nozzles.

In accordance with the above construction, the fluid passes through the plunging cylindrical portion of the connecting pipe from the piping on the upstream side and then enters the seal pipe. Thereafter, the fluid is fed from the seal pipe to the piping on the downstream side under pressure.

The fluid exerts internal pressure on the seal pipe and hence the expansions of the seal pipe increase in diameter due to the internal pressure. As a result, the expansions press against the inner peripheral surface of the cylindrical body of the connecting pipe to thereby achieve fluid-tightness between the seal pipe and the connecting pipe. The higher the pressure of the fluid fed under pressure, the more the internal pressure of the seal pipe increases, thereby raising the fluid-tightness therebetween.

On the other hand, when the feeding of the fluid to the piping under pressure is stopped so as to reduce the internal pressure in the seal pipe, the force for pressing the expansions against the cylindrical body is reduced or eliminated. Therefore, the seal pipe can be easily withdrawn from within the cylindrical body. Further, the seal pipe can be easily inserted into the cylindrical body. Accordingly, the piping on the upstream side can be easily separated from and connected to the piping on the downstream side.

Thus, the fluid-tightness between the seal pipe and the connecting pipe can be ensured upon connecting the piping on the upstream side to the piping on the downstream side. Simultaneously, the separation and connection between the two can be made easy.

When the connecting structure for the piping in accordance with the second aspect of the present invention is used between the cleaning nozzles to be fit in the crossover rack and the washing water supply source, the liquid-tightness between the seal pipe and the connecting pipe, which is capable of bearing a corresponding pressure necessary to clean the out-of-liquid conveying portion, is ensured. Further, even when one attempts to maintain and check the cleaning nozzles or even when it is necessary to attach the crossover rack to the cleaning nozzles and detach the same therefrom for the purpose of maintaining and checking the out-of-liquid conveying portion, the separation and connection therebetween can be made easy.

In acordance with a third aspect of the present invention, there is provided a method of measuring a quantity of cleaning-water, which is suitable for use in a cleaning structure for an out-of-liquid conveying portion, wherein a crossover rack accommodating therein the out-of-liquid conveying portion for conveying a photosensitive material in an out-of-liquid area is removably provided at an upper portion of a processing rack provided within a processing bath to convey a printed photosensitive material into a processing solution and process the photosensitive material in the processing solution, and cleaning nozzles are removably mounted to the crossover rack such that cleaning water is expelled to an interior of the crossover rack through the cleaning nozzles, thereby cleaning the out-of-liquid conveying portion, said method comprising the steps of:

mounting, in place of the crossover rack, a measuring rack provided with a nozzle mounting portion having a closed bottom to the upper portion of the processing rack without providing said out-of-liquid conveying portion, said cleaning nozzle being attachable to and detachable from said nozzle mounting portion, and mounting said cleaning nozzles to said nozzle mounting portion;

thereafter expelling the cleaning water from the cleaning nozzles so as to store the cleaning water in said measuring rack; and thereafter removing said measuring rack from the upper portion of the processing rack so as to measure a quantity of the cleaning water stored in the processing rack.

In accordance with a fourth aspect of the present invention, there is provided a measuring rack for measuring a quantity of cleaning water, which is suitable for use in a cleaning structure for an out-of-liquid conveying portion, wherein a crossover rack accommodating therein the out-of-liquid conveying portion for conveying a photosensitive material in an out-of-liquid area is removably provided at an upper portion of a processing rack provided within a processing bath to convey a printed photosensitive material into a processing solution and process the photosensitive material in the processing solution, and cleaning nozzles are removably mounted to the crossover rack such that cleaning water is expelled to an interior inside of the crossover rack through the cleaning nozzles, thereby cleaning the out-of-liquid conveying portion, said measuring rack comprising:

a main body having a bottom, said main body being removably mounted, instead of the crossover rack, to the upper portion of the processing rack; and a nozzle mounting portion to which the cleaning nozzles may be attached and detached; said measuring rack being able to store the cleaning water expelled from the cleaning nozzles for measurement.

In accordance with the above construction, the out-of-liquid conveying portion held in the crossover rack is cleaned with the cleaning water delivered from the cleaning nozzles.

Processing solution adhering to the out-of-liquid conveying portion is removed by the cleaning action of the cleaning nozzles. When the operation of development processing is stopped while the processing solution adheres to and remains at the out-of-liquid conveying portion and the following development processing is started, for example, the adhered processing solution can be prevented from being transferred onto photographic paper as smudges.

This cleaning can be automatically performed without removing the out-of-liquid conveying portion from the crossover rack.

In order to hold the concentration of the processing solution at a constant level, it is necessary to accurately verify the quantity of the cleaning water delivered from the cleaning nozzles.

Accordingly, the measuring rack is used. The measuring rack is provided as an alternative to the crossover rack. The cleaning water is discharged into and stored in the measuring rack for, for example, a predetermined time interval.

If the measuring rack is removing from the processing rack and the quantity of the cleaning water stored in the measuring rack is measured, the quantity of the cleaning water that has been actually discharged can be measured.

The concentration of a processing solution such as a developer, a bleaching/fixing solution or the like varies in accordance with to the evaporation of water. In order to hold the concentration of the processing solution constant, water of a quantity equivalent to the quantity of the evaporated water is replenished by the cleaning water delivered from the cleaning nozzles, that is, the cleaning water compensates for evaporation.

In this case, the concentration of the processing solution can be sufficiently controlled if based on the measured actual quantity of cleaning water.

Thus, the quantity of the cleaning water delivered from the cleaning nozzles can be easily verified with sufficient accuracy by mounting the measuring rack instead of the crossover rack and measuring the quantity of the cleaning water stored in the measuring rack.

Even if a plurality of processing baths are used, a single measuring rack may be used if the measuring rack is shared by the processing racks used for the individual processing baths, thus providing convenient use.

The above and other objects, features and advantages of the present invention will become apparent from the following description and the appended claims, taken in conjunction with the accompanying drawings in which preferred embodiment of the present invention are shown by way of illustrative example.

BRIEF DESCRIPTION OF THE DRAWINGS

The invention will now be described with reference to the accompanying drawings wherein.

DETAILED DESCRIPTION OF THE PREFERRED EMBODIMENTS

A preferred embodiment of the present invention, which is applied to a printer unit of a printer-processor, will hereinafter be described with reference to FIGS. 1 through 9.

Figure 1:
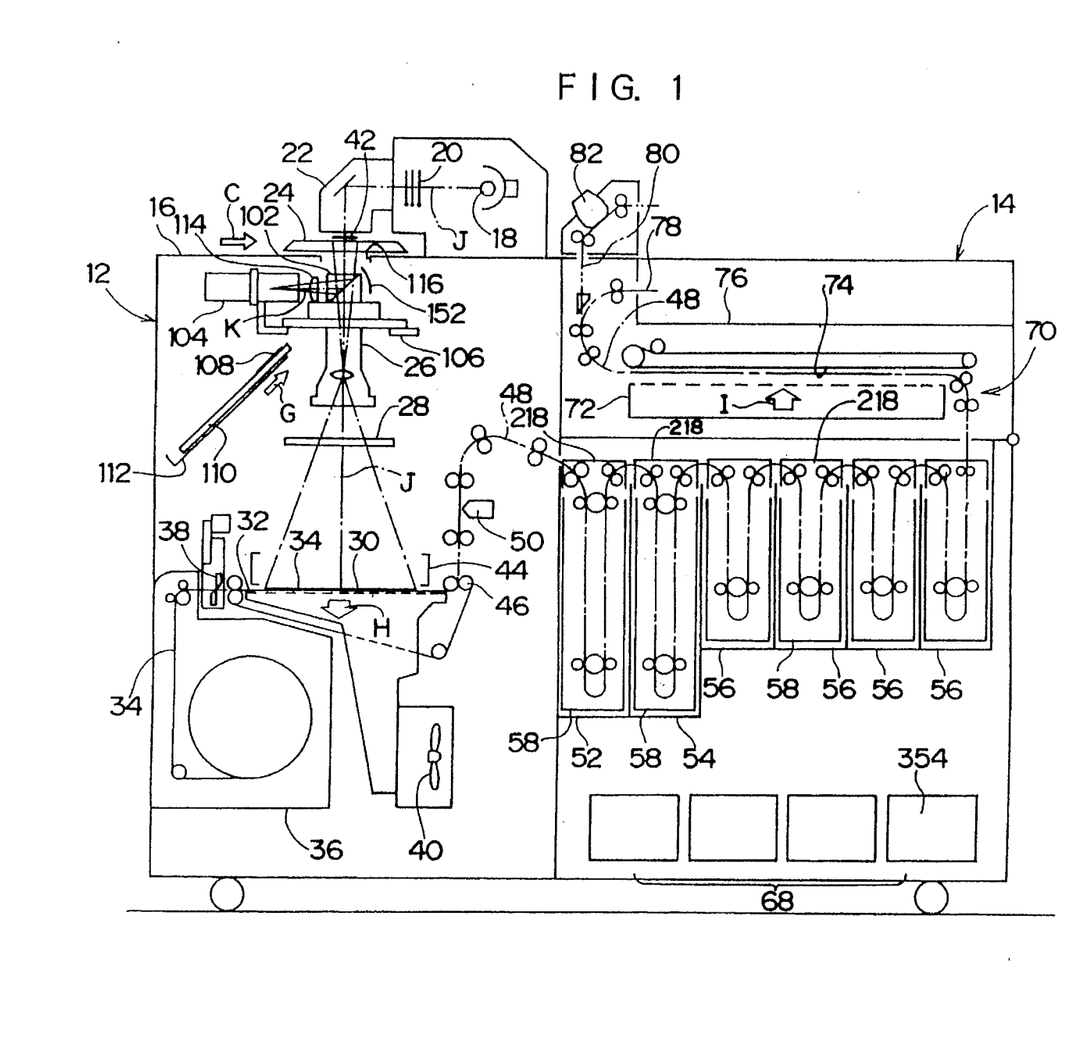
FIG. 1 is a schematic view showing a printer-processor to which the invention can be applied.

As shown in FIG. 1, the printer-processor comprises a printer unit 12 and a processor unit 14. A portion shown on the left side in FIG. 1 corresponds to the printer unit 12 and a portion shown on the right side in FIG. 1 corresponds to the processor unit 14. The printer unit 12 has a light source 18 provided outside a casing 16 of the printer-processor. Light (printing light) whose optical axis is horizontal, is emitted from the light source 18. The emitted light whose optical axis (printing optical axis J) is horizontal, passes through a CC filter 20 made of three filters which are cyan (C), magenta (M) and yellow (Y) and is then bent and falls perpendicularly while being diffused within a diffusion cylinder 22. A negative carrier 24 is attached to an upper surface of the casing 16 so as to be disposed on a vertical optical axis of the light. A lens system 26, a shutter 28 and a printing table 30 are respectively provided within the casing 16 in that order in a downward direction.

The printing table 30 has an upper surface which is horizontal. A conveying belt 32, which is driven so as to move from left to right as seen in FIG. 1 along the upper surface of the printing table 30, is provided on the upper surface thereof. A paper magazine 36, which winds and acomodates photographic paper 34 which serves therearound as a photosensitive material, is provided on the end side of the printing table 30 at which the conveying belt 32 starts to travel. After the photographic paper 34 has been fed out from the paper magazine 36, the photographic paper 34 is cut to a predetermined length by a cutter 38 and is then placed on the conveying belt 32, after which the photographic paper 34 is conveyed to a predetermined position on the printing table 30. A plurality of apertures are defined in the respective upper surfaces of the printing table 30 and the conveying belt 32 moved along the upper surface thereof so as to communicate with each other. By bringing the interior of the printing table 30 into negative pressure with a suction fan 40 (the direction in which the interior is sucked by the suction fan 40 is indicated by arrow H), the photographic paper 34 can be sucked to and held by the printing table 30 through the conveying belt 32 at the predetermined position on the printing table 30.

A negative film 42 is loaded into the negative carrier 24. An image recorded on the negative film 42 can be printed onto the photographic paper 34 which has been sucked to and held by the printing table 30.

An easel device 44 is provided above the printing table 30. When an image with edges is printed onto the photographic paper 34, the easel device 44 can cover the peripheral edges of the photographic paper 34.

The photographic paper 34, which has been subjected to printing, is conveyed by the conveying belt 32 while being sucked to and held by the printing table 30. The photographic paper 34 passes between a pair of rollers 46 provided on the end side of the printing table 30 at which the conveying belt 32 stops traveling, so that the direction in which the photographic paper 34 is conveyed is changed from the horizontal direction to the vertical direction, whereby the photographic paper 34 is separated from the conveying belt 32 to proceed to the processor unit 14. A path 48 along which the photographic paper 34 is conveyed is indicated by dashed lines in FIG. 1.

A print head 50 is provided so as to be opposed to the conveying path 48 extending from the printing table 30 to the processor unit 14 and is able to effect printing onto the printed photographic paper 34.

In the processor unit 14, a developing bath 52, a bleaching/fixing bath 54 and four washing baths 56 are provided in that order from the printer unit 12 side so as to be adjacent to each other. The developing bath 52, the bleaching/fixing bath 54 and the washing baths 56 are respectively filled with a developer, a bleaching/fixing solution and washing water. Further, processing racks 58 are respectively provided within the processing baths. The processing racks 58 convey or feed the photographic paper 34 into the processing solutions in the form of the letter U. During this conveying process, the photographic paper 34 is subjected to development processing within the developing bath 52. Further, the photographic paper 34 is subjected to bleaching and fixing within the bleaching/fixing bath 54, followed by subjection to a washing process within the washing baths 56.

Replenishing tanks 68 communicate with the developing bath 52, the bleaching/fixing bath 54 and the washing baths 56 so as to correspond thereto. The replenishing tanks 68 respectively replenish the developer, the bleaching/fixing solution and the washing water into these baths.

The photographic paper 34 which has been subjected to these respective processes is conveyed to a drying unit 70 located at an upper position within the processor unit 14. In the drying unit 70, the photographic paper 34 is exposed to hot air blown (in the direction is indicated by arrow I) by a chamber 72 from below so as to press against a lower part of a mesh belt 74. In this condition, the photographic paper 34 is horizontally conveyed under the movement of the mesh belt 74 and is dried while being conveyed by the mesh belt 74.

The photographic paper 34, which has been subjected to the drying process is folded back in a U-shape form at an end of the drying unit 70 so as to be discharged into an external stock unit 76. Thereafter, the photographic paper 34 is stacked with other photographic papers 34 and stocked in the stock unit 70.

A branch path 80 provided at an end portion of the drying unit 70 so as to branch off from a main path 78 extending to the stock unit 76 is connected to the conveying path 48. The branch path 80 extends to a densitometer 82. When a photographic paper is used to measure the density of deteriorated developer, the photographic paper is inserted into the branch path 80 without being ejected from the drying unit 70 to the stock unit 76 so that the density of the deteriorated developer is measured by the densitometer 82.

When the negative film 42 is a 35-mm film or the like, a prism (beam splitter) 102 is provided on the upper side of the lens system 26. The prism 102 allows light (printing light) emitted from the light source, which has passed through the negative film 42, to pass in a downward direction as it is, so that the light is applied to the lens system 26. Further, a part of the printing light is applied as measured light in the left direction as seen in FIG. 1. An optical axis K of the measured light is made horizontal. A sensor (light-receiving means) 104 having a CCD is disposed on the optical axis of the measured light. The sensor 104 receives the measured light to measure the density and color of the negative film 42, for example, and corrects the measured color and density, whereby a printing condition can be selected.

The lens system 26 is provided integrally with the prism 102 and horizontally moves on a support table 106, i.e., the lens system 24 is movable in a direction orthogonal to the surface of the drawing of FIG. 1. The lens system 26 is provided so as to be move onto and from withdraw from a printing optical axis J. By shifting the lens system 26 toward the rear side of FIG. 1 so as to be separated from the printing optical axis, another lens system can be moved from the front side of FIG. 1 while placed on the support table 106, whereby the other lens system can be disposed on the printing optical axis.

When the negative film 42 is a Brownie film, another lens system corresponding to the film is loaded. Since this type of lens system is large, a photometric mirror (hereinafter called simply "mirror") 108 other than a prism is used to apply measuring light. The mirror 108 is held by a leading end of a holding plate 110. When the mirror 108 is not in use, the holding plate 110 is accommodated within a storage plate 112. Since the mirror 108 is positioned so as to be withdrawn from the printing optical axis J, the mirror 108 does not block the printing light. When the mirror 108 is in use, the holding plate 110 is moved diagonally and upwardly (in the direction indicated by arrow G) from the storage plate 112 (i.e., moved to a position indicated by the chain line in FIG. 1) before the other lens system (not shown) is placed on the printing optical axis after the lens system 26 has been withdrawn from the printing optical axis. Thus, the mirror 108 is placed on the printing optical axis between the negative film 42 and the photographic paper 34 to thereby reflect the printing light transmitted through the negative film 42 as measuring light, without the printing light being illuminated to the photographic paper 34. An optical axis L of the measuring light is made coaxial with the optical axis K of the measuring light applied through the prism 102. Thus, the sensor 104 can receive any measuring light.

The measuring light applied from the prism 102 has a different optical path length than that reflected by the mirror 108. In order to correct this difference, a compensating lens 114 is disposed in the optical axis of the measuring light as shown in FIG. 1. The compensating lens 114 is provided integrally with the prism 102 on the the measuring light emitting side the prism 102 (this mounting structure is not shown). The compensating lens 114 is movable together with the lens system 26. When the mirror 108 is used, the compensating lens 114 is provided so as to be withdrawn from the optical axis of the measuring light.

The processing racks provided within the processing baths will now be described in detail.

Figure 2:
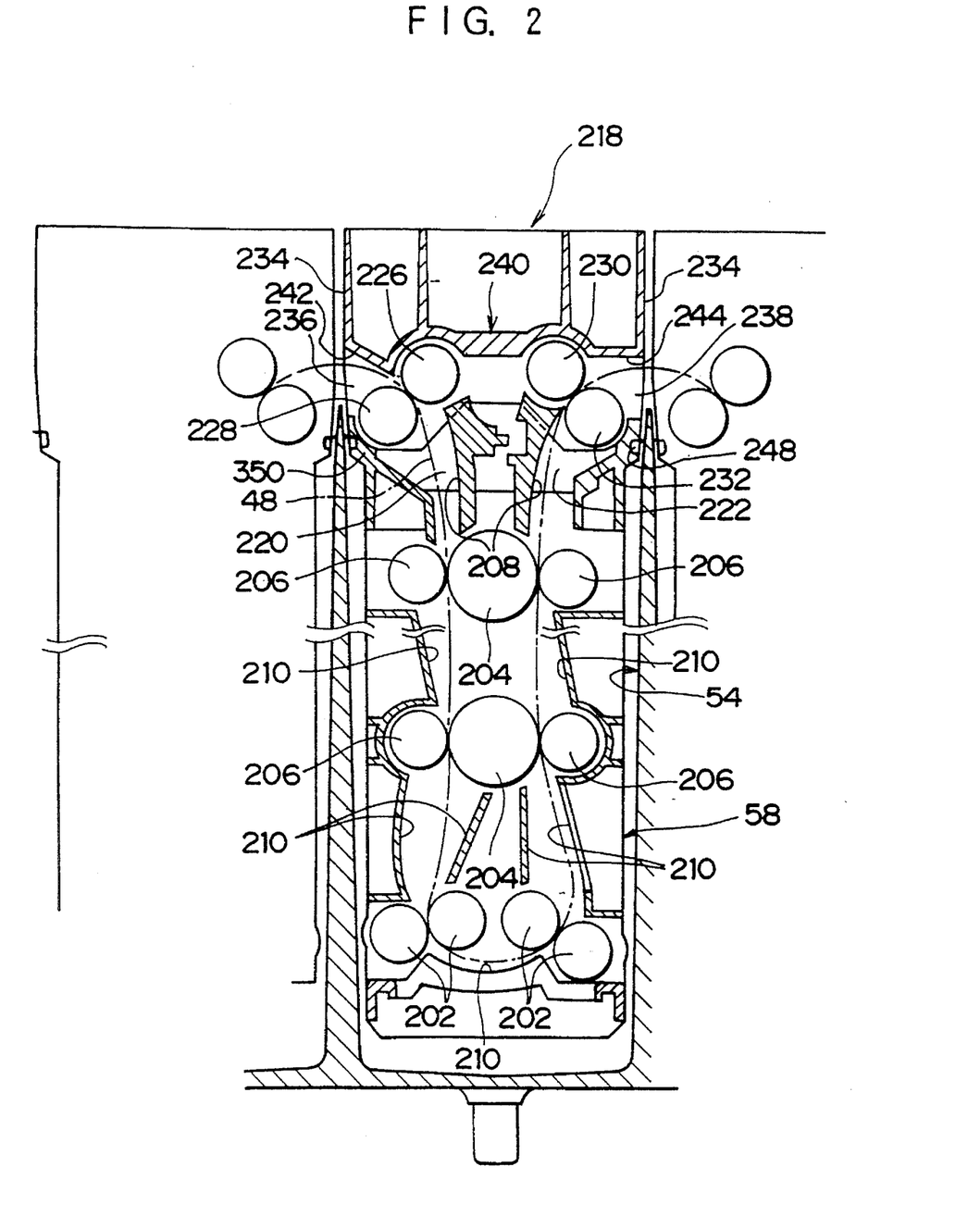
FIG. 2 is a vertical cross-sectional view showing a processing rack disposed in a processing tank.

A description will be made of the processing rack provided within the bleaching/fixing bath 54 of the processing baths which are the developing bath 52, the bleaching/fixing bath 54 and the washing baths 56. As shown in FIG. 2, the processing rack 58 is provided within the bleaching/fixing bath 54 so as to be inserted and withdrawn along upward and downward directions as seen from an open upper portion of the bleaching/fixing bath 54. The processing rack 58 is suspended so as to be held by, for example, a stay (not shown) provided at an upper position. In-liquid rollers and a guide plate are provided in the processing rack 58 so as to convey the photographic paper 34 into a processing solution in the form of the letter U (the conveying path 48 is indicated by dashed lines). The in-liquid rollers comprises a roller unit placed at the bottom of the U-shaped conveying path and a plurality of roller units located at the center of the U-shaped path. At the roller unit at the bottom of the-conveying path, the photographic paper 34 is conveyed while being nipped between two pairs of rollers 202. Each roller unit at the center of the conveying path includes a centeral roller 204 and a pair of rollers 206 which are provided at the sides of the central roller 206. The photographic paper 34 is nipped between and conveyed by the central rollers 204 and the rollers 206 such that the central rollers 204 are used for both a forward path and a return path of the photographic paper 34. All the rollers are provided horizontally and in parallel. The guide plate comprises a pair of liquid exit/entrance guides 208 which is located so as to extend between an in-liquid area and an out-of-liquid area and serves to define an in-liquid entrance 220 and an out-of-liquid exit 222, and a pair of central guides 210 located between the roller units.

A rack cover 350 is mounted to an upper portion of the processing rack 58. The pair of exit/entrance guides 208 is provided within the rack cover 350. The in-liquid entrance 220 and the out-of-liquid exit 222 are defined in the rack cover 350.

Figure 3:
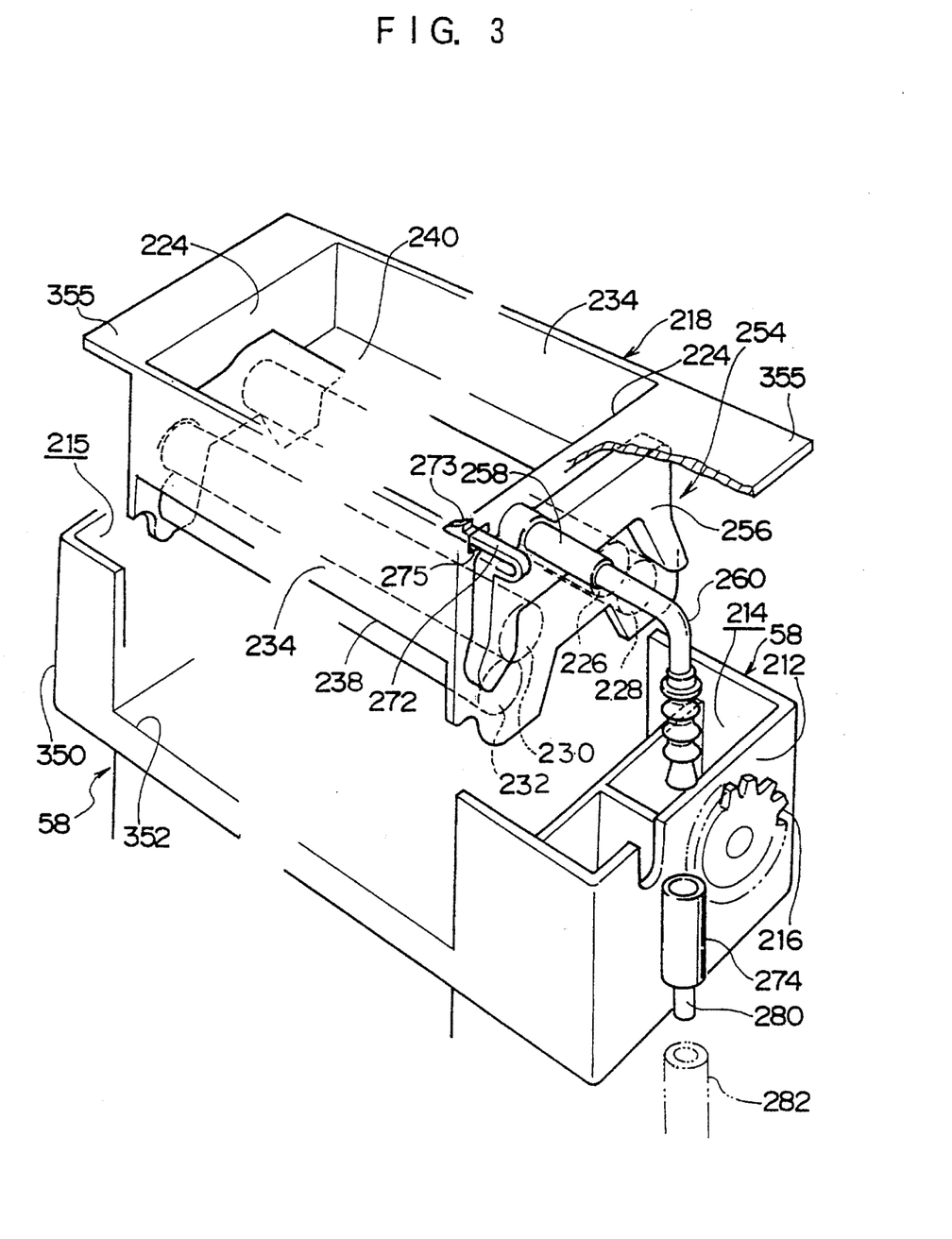
FIG. 3 is a perspective view illustrating a state in which a cleaning nozzle unit is mounted on a crossover rack.

As shown in FIG. 3, the rack cover 350 has machine rooms 214 and 215 respectively provided inside side walls 212 opposed to each other along the axial directions of the in-liquid rollers. A pair of spiral toothed wheels (not shown) maintained in meshing engagement with each other is accommodated in the machine room 214. The axial direction of the pair of spiral toothed wheels extends parallel to the axial directions of the in-liquid rollers. The pair of spiral toothed wheels is able to transfer the rotation of a sprocket 216 located outside the processing rack 58 to a shaft (not shown) provided so as to extend outside the processing rack 58 with the vertical direction regarded as the axis of rotation thereof. The sprocket 216 is rotatably driven by an unillustrated drive motor through an illustrated chain in the same manner. Further, the rotation of the shaft is transferred to the drive rollers of the in-liquid rollers via the toothed wheels.

As shown in FIGS. 2 and 3, a crossover rack 218 is removably located in an upper position of the processing rack 58 so as to enter between the machine rooms 214 and 215 of the rack cover 350. The crossover rack 218 is shaped in the form of a rectangle and accommodates therein out-of-liquid rollers mounted between opposed side walls 224. The out-of-liquid rollers comprise an introduction roller unit which is composed of two rollers 226 and 228 and conveys the photographic paper 34 while nipping the same between the rollers 226 and 228, and a withdrawal roller unit which is composed of two rollers 230 and 232 and conveys the photographic paper 34 while interposing the same between the rollers 230 and 232. All the rollers are provided in parallel to the in-liquid rollers. The introduction roller unit is provided in an opposing relationship to the in-liquid entrance 220, whereas the withdrawal roller unit is provided in an opposing relationship to the out-of-liquid exit 222. The crossover rack 218 is closed by a roller cover 240 which is provided at an intermediate portion of the processing rack 58 as seen in upward and-downward directions thereof and covers the upper side of the out-of-liquid rollers. Further, the lower side of the out-of-liquid rollers is open so as to communicate with the in-liquid entrance 220 and the out-of-liquid exit 222.

Lower portions of opposed side walls 234, which are portions of the side walls of the crossover rack 218 and are opposed to the peripheral surfaces of the out-of-liquid rollers, are cut from the roller cover 240 so as to be defined as a rack entrance 236 and a rack exit 238. A pair of rectangular cut-away portions 352 is defined in upper edges of the rack cover 350 so as to be opposed to the rack entrance 236 and the rack exit 238. The upper rollers 226 and 230 of the rollers respectively forming the introduction roller unit and the withdrawal roller unit are rotated and driven by the shaft. The photographic paper 34 passes through the rack entrance 236 and is conveyed while being nipped between the rollers of the introduction roller unit so as to be introduced into a solution or liquid from the out-of-liquid area via the in-liquid entrance 220. After the photographic paper 34 introduced into the solution has been conveyed in the U-letter form, the photographic paper 34 passes through the out-of-liquid exit 222 and is conveyed from the in-liquid area to the out-of-liquid area while being nipped by the withdrawal roller unit, after which the photographic paper 34 is discharged through the rack exit 238. The roller cover 240 of the crossover rack 218 serves as a guide 242 for guiding the photographic paper 34 to the introduction roller unit at the rack entrance 236. At the rack exit 238, the roller cover 240 serves as a guide 244 for guiding the photographic paper 34 from the introduction roller unit to the rack exit 238. The guides 242 and 244 and the out-of-liquid rollers 226, 228, 230 and 232 constitute an out-of-liquid conveying unit or portion provided outside the solution or liquid, for conveying the photographic paper 34.

A flange-shaped plate 355 is formed so as to project from an upper end of the crossover rack 218 and to cover the upper side of the machine rooms 214 and 215 provided within the rack cover 350.

Figure 4:
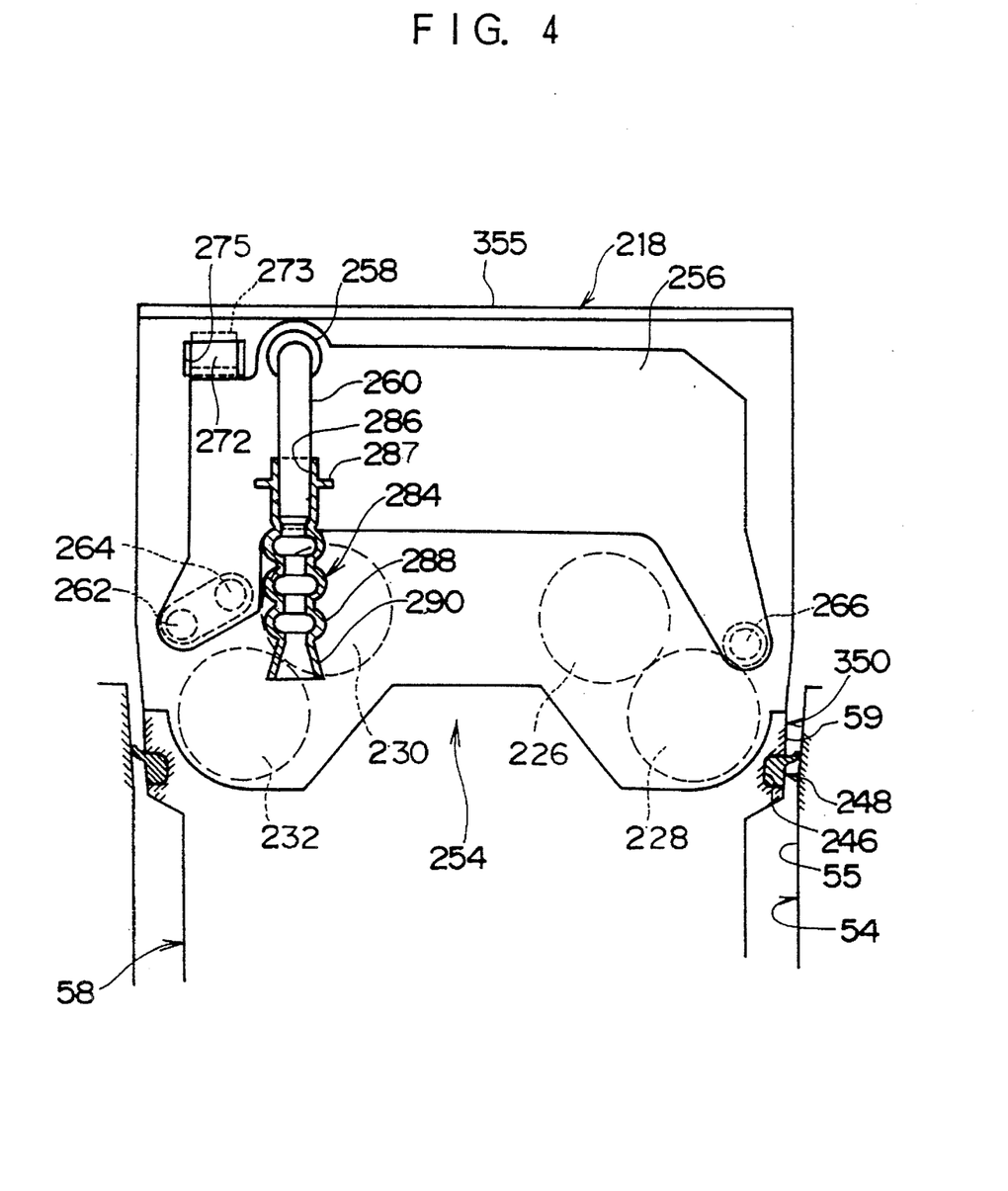
FIG. 4 is a schematic side view showing a state in which the cleaning nozzle unit is mounted on the crossover rack and showing out-of-liquid rollers as seen in their axial directions.
Figure 9A:
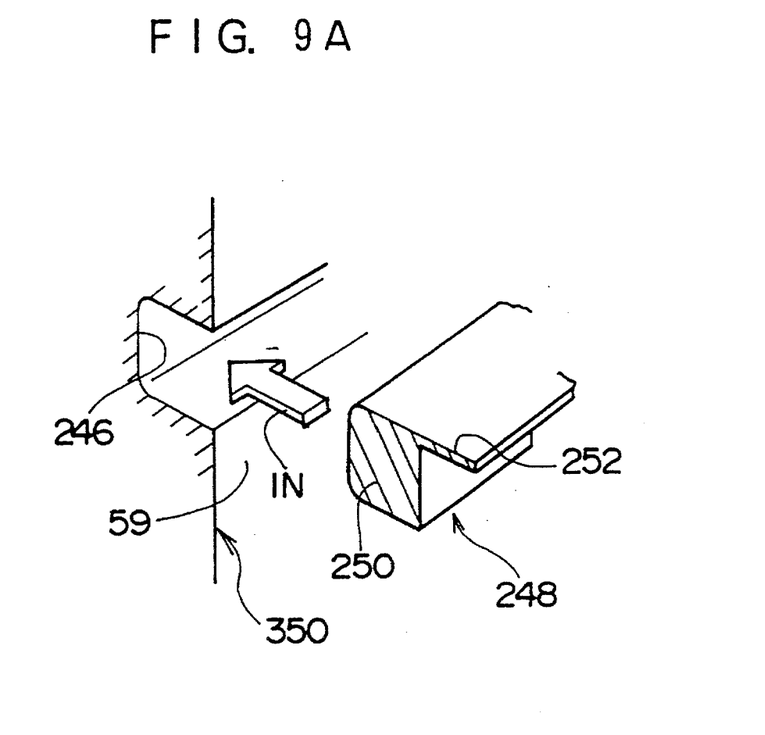
FIGS. 9A and 9B are respectively perspective views illustrating a sealing member provided between a processing rack and a processing tank.
Figure 9B:
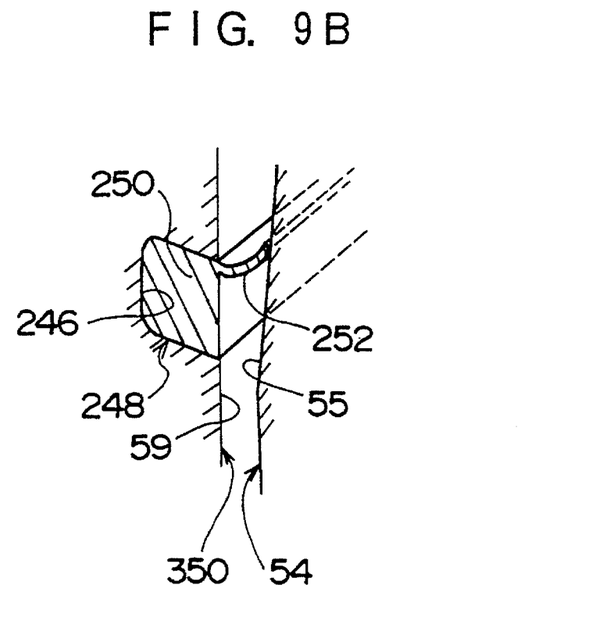

As shown in FIGS. 4 and 9, a concave portion 246 is defined in an outer peripheral surface (a rack outer peripheral surface 59 used as an outer peripheral portion) of the rack cover 350 at an upper end of the processing rack 58. The concave portion 246 extends over the entire periphery of the rack cover 350. A sealing member 248 is inserted into the concave portion 246 along the direction indicated by arrow IN shown in FIG. 9(A) so as to be fit in and held by the concave portion 246. The concave portion 246 is rectangular in section as seen in the circumferential direction of the rack cover 350. The sealing member 248 comprises a rectangular portion 250, which is rectangular in section in a manner similar to the concave portion 246, and a projection 252 which horizontally projects from an upper end of the rectangular portion 250, both of which are integrally formed over the entire periphery of the rack cover 350. Further, the sealing member 248 is opposed to an inner peripheral surface (inner peripheral portion) of the processing bath 54 at an upper end of the processing bath 54 (first body). In a state in which the processing rack 58 (second body) is inserted from the open upper portion of the bath 54 and placed on a placement portion (the state shown in FIG. 2), the projection 252 presses against the inner peripheral surface 55 of the bath 54, so that liquid-tightness between the outer periphery of the processing rack 58 and the solution in the bath 54 is achieved.

The sealing member 248 is composed of elastically-deformable silicon, for example. It suffices that the concave portion 246 and the rectangular portion 250 are not strictly rectangular in section. Specifically, the sectional configurations of the concave portion 246 and the rectangular portion 250 may be rectangular shapes such as substantially rectangular shapes whose corners have been chamfered, or the like.

As shown in FIG. 3, a cleaning or cleaning nozzle unit 254 is attached to the crossover rack 218.

Figure 7:
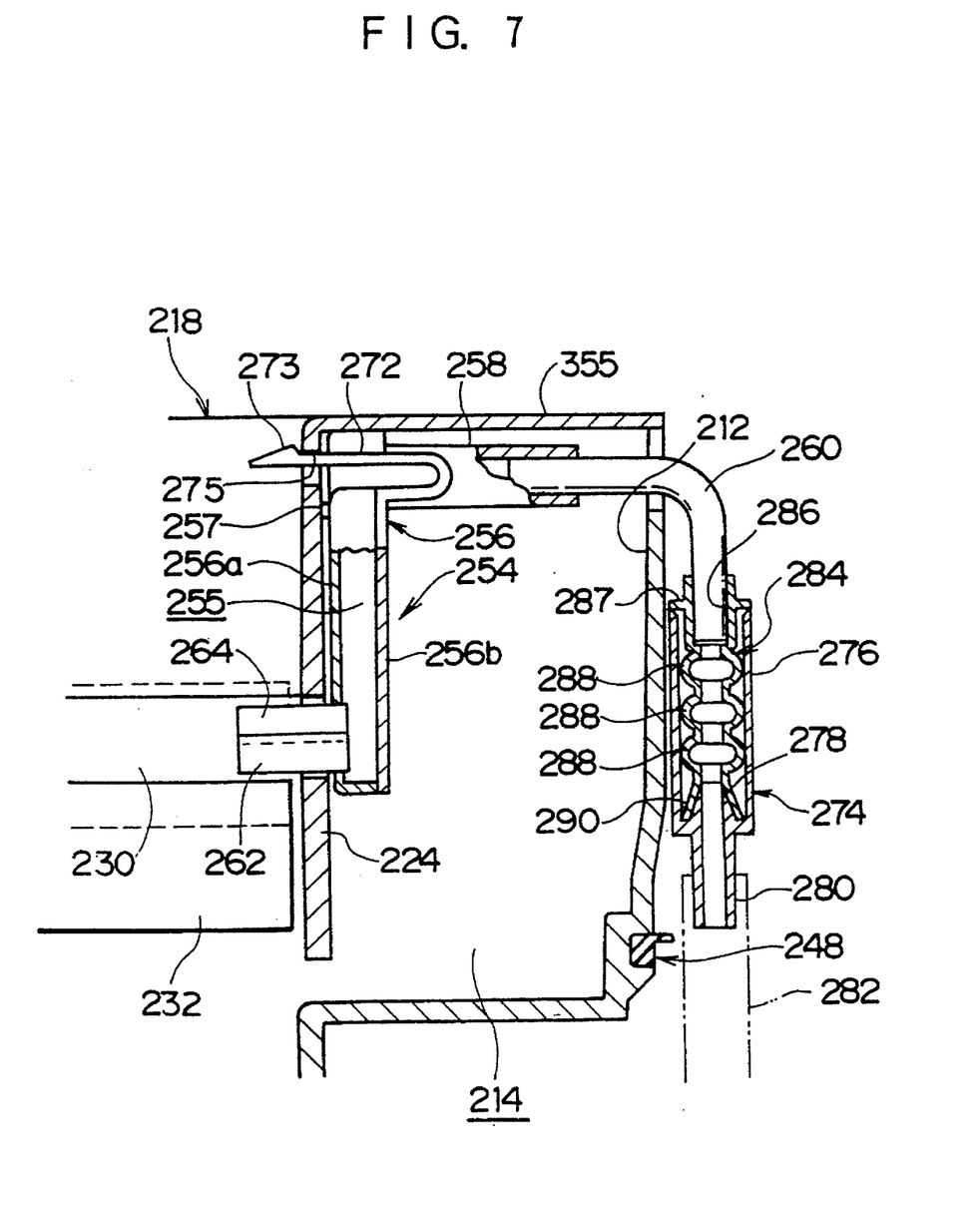
FIG. 7 is a partially sectional front view illustrating a connecting structure for a piping mounted to the cleaning nozzle unit and is a view showing the connecting structure as seen in a direction opposed to a peripheral surface of each out-of-liquid roller.

As shown in FIG. 7, the cleaning nozzle unit 254 has a case 256 having a hollow or cavity defined therein, which is provided so as to be opposed to the one side wall 224 of the crossover rack 218. The case 256 comprises a bowl-shaped member 256a shallow and a cover 256b for closing the bowl-shaped member 256a. The bowl-shaped member 256a has a bottom which faces the side opposed to the side wall 224. The cover 256b faces the side wall 224 on the side opposite to the side wall 224 side. A joint pipe (connecting portion) 258 is provided at an upper end of the case 256 so as to horizontally project from the outer surface of the case 256 provided on the side opposite to the side wall 224. The joint pipe 258 communicates with the inside of the case 256. An L-shaped pipe (piping) 260 is horizontally coupled to the inside of the joint pipe 258 and the other end thereof is suspended in a downward direction.

Figure 5:
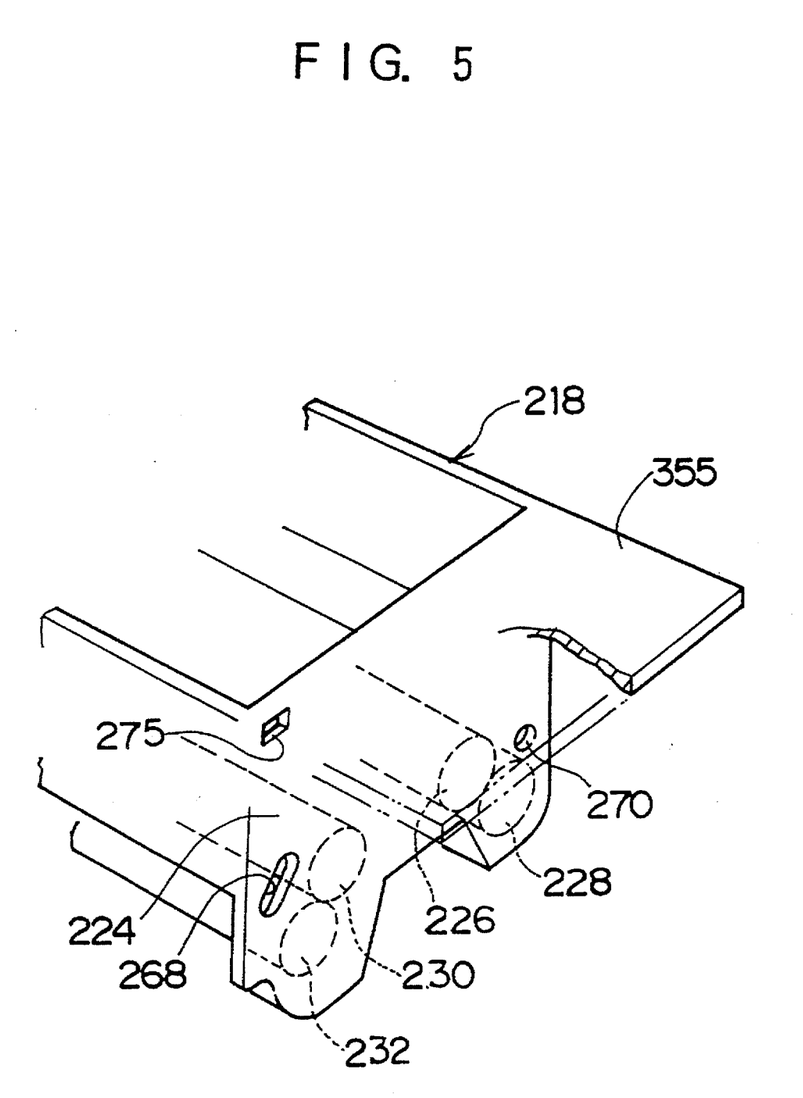
FIG. 5 is a perspective view depicting a portion of the crossover rack.
Figure 6:
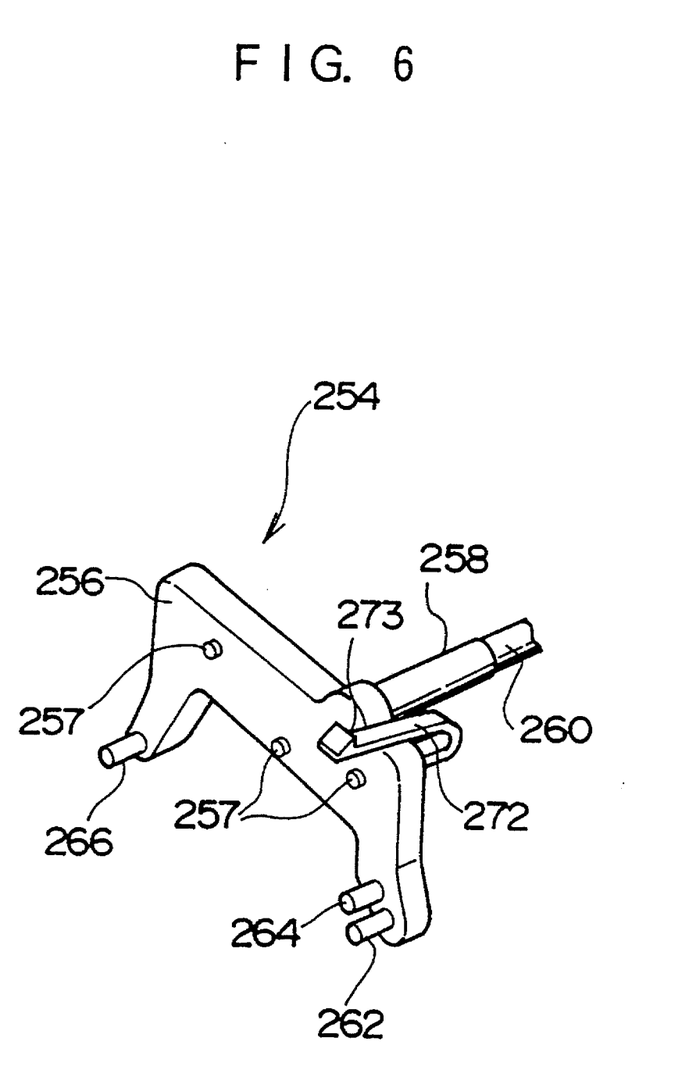
FIG. 6 is a perspective view illustrating the cleaning nozzle unit as seen from the side opposite that shown in FIG. 3.

As shown in FIG. 6, cleaning or cleaning nozzles 262, 264 and 266, which communicate with the inside of the case 256, are formed on the outer surface of the case 256 located on the opposite side of the corresponding side wall 224 so as to project from the outer surface thereof. As shown in FIG. 5, through-holes 268 and 270 are defined in the side wall 224 so as to correspond to the cleaning nozzles 262, 264 and 266. As shown in FIG. 7, the cleaning nozzles 262, 264 and 266 enter into the side wall 224 via the through-holes 268 and 270 in parallel to the axial directions of the out-of-liquid rollers.

Of the three cleaning nozzles 262, 264 and 266, the two cleaning nozzles 262 and 264 are provided on the rack exit 238 side for the rollers 230 and 232. The remaining cleaning nozzle 266 is provided on the rack entrance 236 side for the rollers 226 and 228. The out-of-liquid conveying portion constructed by the rollers 226, 228, 230, 232 and the guides 242 and 244 is cleaned with cleaning water discharged through the cleaning nozzles 262, 264 and 266.

If, for example the cleaning nozzle 264 is constructed as a flat spray type and each of the cleaning nozzles 262 and 266 is constructed as an oblique spray type, the peripheral surfaces of the rollers 226, 228, 230 and 232 and the guides 242 and 244 can be satisfactorily cleaned.

Incidentally, the through-hole 268 is defined as an elongated hole for allowing the two nozzles 262 and 264 to pass together therethrough. The through-hole 270 is defined as a circular hole for allowing the nozzle 266 to pass therethrough alone.

Further, the case 256 has an interlocking member 272 provided at an upper end thereof so as to project from the surface-thereof opposite to the side wall 224 on a support-by-cantilever basis. The leading end of the interlocking member 272 is folded back in U-shaped form and passes through the upper side of the case 256 so as to extend toward the side wall 224. A rectangular interlocking hole 275 is defined in the side wall 224 so as to correspond to the leading end of the interlocking member 272. The interlocking member 272 can be elastically and flexibly deformed. In a state in which the cleaning nozzles 262, 264 and 266 have been disposed so as to extend through the through-holes 268 and 270, the interlocking member 272 is flexed so that a hook 273 of the leading end of the interlocking member 272 is depressed downward, thereby allowing the hook 273 to penetrate into the interlocking hole 275. When the depression of the hook 273 in the downward direction is stopped after completion of penetration thereof, the hook 273 engages an upper edge of the interlocking member 275 owing to the recovery or return deformation of the interlocking member 272 to thereby prevent the interlocking member 272 from being released out of the interlocking hole 275. The cleaning nozzle unit 254 is supported by three through-holes defined in the side wall 224: the through-hole 268, the through-hole 270 provided on the opposite side of the through-hole 268 and the interlocking hole 275 provided above the through-hole 268. Further, the cleaning nozzle unit 254 is prevented from moving in a direction extending along the surface of the side wall 224. The cleaning nozzle unit 254 is mounted to the crossover rack 218 in this way.

In the state in which the cleaning nozzle unit 254 has been attached to the crossover rack 218, three protrusions 257 formed so as to project from the outer surface of the case 256 provided on the opposite side of the side wall 224 are brought into contact with the side wall 224. The cleaning nozzle unit 254 is supported by the three protrusions 257, thereby providing stability.

In order to release the cleaning nozzle unit 254 from the crossover rack 218, the interlocking member 272 is flexed to release the hook 273 from engagement with the interlocking hole 275. Thereafter, the hook 273 may be withdrawn from the interlocking hole 275.

A connecting pipe 274 is provided on the processing bath 54 side so as to be opposed to the other end of the L-shaped pipe 260 which hangs downward. As shown in FIG. 7, the connecting pipe 274 has a cylindrical body 276 whose axial direction corresponds to upward and downward directions. Further, the cylindrical body 276 has an open upper end and a closed lower end. A thrusting or plunging cylindrical portion 278 that plunges into the cylindrical body 276 is provided at the closed lower end of the cylindrical body 276 and is coaxial with the cylindrical body 276. A plunging leading end (upper end) of the plunging cylindrical portion 278 is open so as to communicate with the cylindrical body 276. A lower end of the plunging cylindrical portion 278 is opened so as extend downward from the cylindrical body 276 as it is. A connecting portion 280 provided on the upstream side is formed on the outer periphery of the formed extension. A piping 282 provided on the upstream side is fit with the connecting portion 280 so as to be coupled thereto.

The piping 282 is coupled to a washing water replenishing tank 354 (see FIG. 1). Washing water is used as cleaning water and the washing water replenishing tank 354 serves as a cleaning water supply source. A pump, a distributor, a solenoid-controlled valve (all not shown) are coupled to the piping 282 so as to be successively provided downstream from the washing water replenishing tank 354. The pump is used to feed the cleaning water under pressure. The solenoid-controlled valve is controlled by a control unit (not shown) to supply the cleaning water to each cleaning nozzle unit 254 for a predetermined time interval and for predetermined number of times. The distributor is used to distribute the cleaning water to each of the cleaning nozzle units 254 of the crossover rack units corresponding to the respective processing baths.

A seal pipe 284 is inserted into the cylindrical body 276 from the open upper end of the cylindrical body 276 so as to be coaxial therewith. Further, the seal pipe 284 can be withdrawn from the open upper end of the cylindrical body 276. The seal pipe 284 is composed of an elastically deformable material and has upper and lower ends which are both open. The L-shaped pipe 260 serves as a piping provided on the downstream side. A lower end of the piping is inserted into and connected to the upper end of the seal pipe 284. The upper end of the seal pipe 284 serves as a connecting portion 286 of the piping, which is provided on the downstream side. A flange 287 is provided at the upper end of the seal pipe 284. When the flange 287 is brought into contact with the upper end of the cylindrical body 276, the degree of insertion of the seal pipe 284 into the cylindrical body 276 is controlled. The seal pipe 284 includes a plurality of expansions 288 provided along the axial direction thereof at predetermined intervals. Each of the expansions 288 has an annular and egg-like shape. An expansion 290 provided at the lower end of the seal pipe 284 is shaped in the form of a cone. The expansion 290 is fit on the outer periphery of the plunging cylindrical portion 278 which is shaped conically so as to correspond to the expansion 290. When the cleaning water enters the seal pipe 284 from the plunging cylindrical portion 278 and internal pressure arises in the seal pipe 284, the expansions 288 and 290 increase in diameter due to the internal pressure so that outer peripheral portions of the expansions 288 and 290 are brought into contact with an inner peripheral surface of the cylindrical body 276 under pressure, thereby making it possible to achieve liquid-tightness between the seal pipe 284 and the cylindrical body 276. When the seal pipe 284 is not subjected to internal pressure, an under-pressure contacting force arising between the expansions 288 and 290 of the seal pipe 284 and the inner peripheral surface of the cylindrical body 276 is reduced or eliminated.

Figure 8:
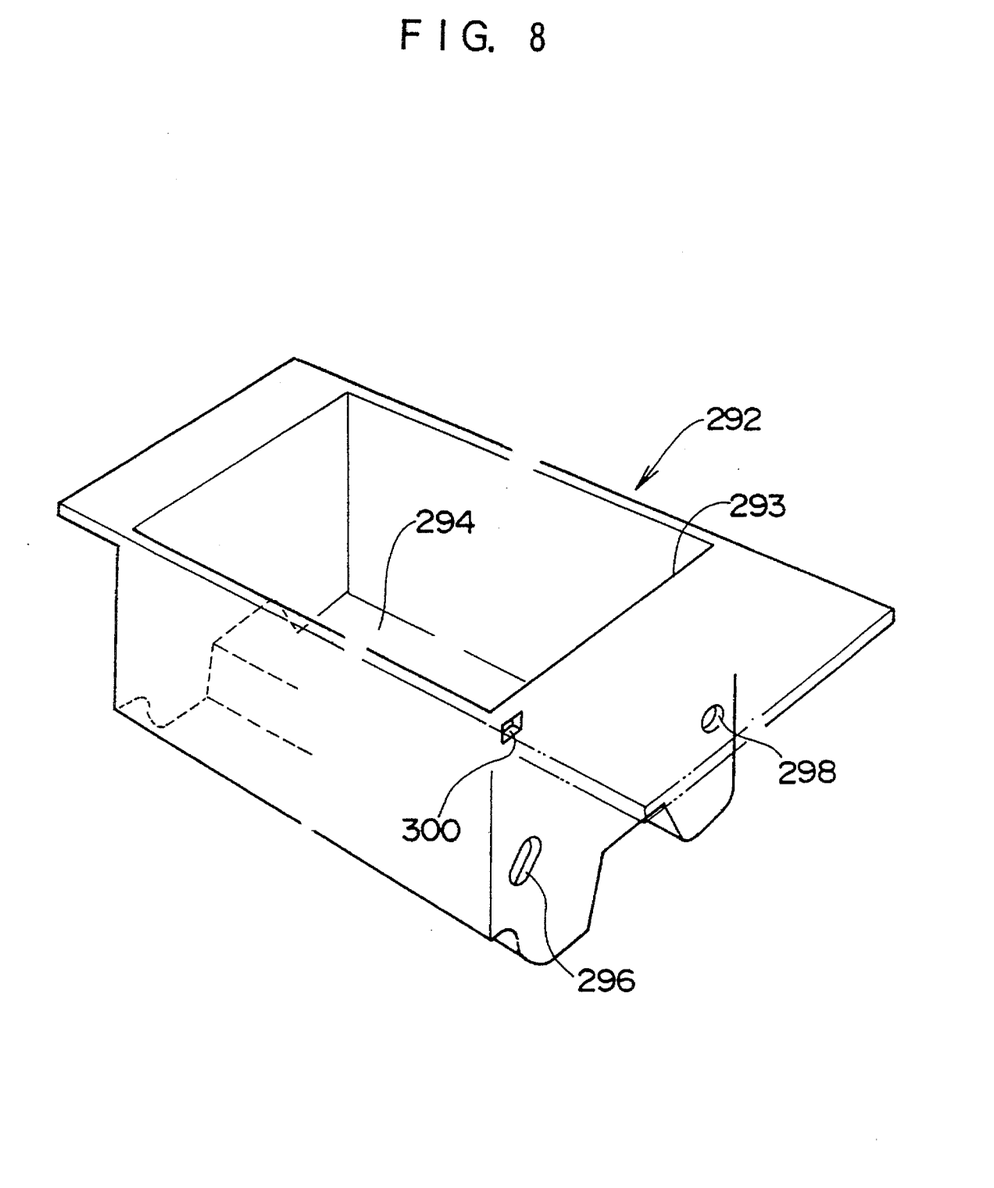
FIG. 8 is a perspective view showing a measuring rack.

A description will now be made of a measuring rack 292 for measuring the quantity of cleaning water delivered from the cleaning nozzles.

Namely, the measuring rack 292 is mounted on the processing rack 58 as shown in FIG. 8 as an alternative to the crossover rack 218. The measuring rack 292 has an outline shaped in a manner similar to the crossover rack 218. However, the measuring rack 292 has a bottom 294 which is closed to enable the measuring rack 292 to store cleaning water therein as will be described later. The out-of-liquid conveying portion or the like is not provided.

Further, through-holes 296 and 298 corresponding to the above through-holes 268 and 270 and an interlocking hole 300 corresponding to the above interlocking hole 275 are defined in a side wall (nozzle mounting portion) 293 corresponding to the side wall 224 of the crossover rack 218.

The cleaning nozzle unit 254 detached from the crossover rack 218 is attached to the measuring rack 292 in the same manner as when it is mounted on the crossover rack 218.

After the cleaning nozzle unit 254 has been mounted on the measuring rack 292, the cleaning water is discharged from the cleaning nozzles 262, 264 and 266. The solenoid-controlled valve is operated by the aforementioned control unit so that the cleaning water supplied from the washing water replenishing tank 354 is discharged for a predetermined time interval and for a predetermined number of times.

The cleaning water discharged into the measuring rack 292 is stored in the measuring rack 292. After the cleaning water has been stored in the measuring rack 292, the quantity of the cleaning water in the measuring rack 292 is measured. Thus, the actual quantity of cleaning water discharged from the flush nozzles can be measured.

Incidentally, the above description is not necessarily limited to the bleaching/fixing bath, and can also be applied to the developing bath and the washing baths.

The operation of the aforementioned embodiment will now be described.

In accordance with the above construction, the out-of-liquid conveying portion accommodated within the crossover rack 218 is cleaned with the cleaning water delivered from the cleaning nozzles 262, 264 and 266.

Processing solutions, which have adhered to the out-of-liquid conveying portion are washed away therefrom by the above cleaning process. Thus, when, for example, the cleaning process is stopped while the processing solutions remain adhered to the out-of-liquid conveying portion and the following cleaning process is started, the processing solutions adhered thereto can be prevented from being transferred onto photographic paper 34 as smudges This cleaning process can be automatically carried out without removing the out-of-liquid conveying portion from the crossover rack 218.

It is necessary to accurately verify or confirm the quantity of cleaning water delivered from the cleaning nozzles 262, 264 and 266 in order to hold the concentration of processing solutions constant.

Accordingly, the measuring rack 292 is used. The measuring rack 292 is mounted in the processing rack 58 as an alternative to the crossover rack 218. The cleaning water is discharged into and stored in the measuring rack 292 for, for example, a predetermined time interval.

If the measuring rack 292 is removed from the processing rack 58 and the quantity of the cleaning water stored in the measuring rack 292 is measured, the quantity of the cleaning water that has been actually discharged can be measured.

The concentration of a processing solution such as a developer, a bleaching/fixing solution or the like varies in accordance with to the evaporation of water. In order to hold the concentration of the processing solution constant, water of a quantity equivalent to the quantity of the evaporated water is replenished by the cleaning water delivered from the cleaning nozzles, that is, the cleaning water compensates for evaporation.

In this case, the concentration of the processing solution can be sufficiently controlled based on the measured actual quantity of the cleaning water.

Thus, the quantity of the cleaning water delivered from the cleaning nozzles 262, 264 and 266 can be easily verified with satisfactory accuracy by mounting the measuring rack 292 instead of the crossover rack 218 and measuring the quantity of the cleaning water stored in the measuring rack 292.

Even if a plurality of processing baths are provided, a single measuring rack 292 may be shared by the processing racks 58 used for the individual processing baths, thereby providing convenience.

In order to mount the cleaning nozzle unit 254 on the crossover rack 218, the cleaning nozzles 262, 264 and 266 are made to penetrate through the through-holes 268 and 270 defined in the side wall 224 of the crossover rack 218. In this state, the interlocking member 272 is brought into elastic engagement with the corresponding interlocking hole 275. Thus, the case 256 is mounted on the side wall 224 of the crossover rack 218. In the state in which the case 256 has been mounted on the side wall 224, the out-of-liquid conveying portion, i.e., the rollers 226, 228, 230, 232 located outside the liquid and the guides 242 and 244 and the like, can be cleaned by discharging the cleaning water from the cleaning nozzles 262, 264 and 266.

In order to detach the cleaning nozzle unit 254 from the crossover rack 218 for the purpose of maintenance and inspection of the cleaning nozzles 262, 264 and 266 and the crossover rack 218 and the processing rack 58, for example, the interlocking member 272 may be released from the interlocking hole 275. Further, the cleaning nozzles 262, 264 and 266 may be withdrawn from the through-holes 268 and 270.

As a result, the cleaning nozzle unit 254 can be easily attached to and removed from the crossover rack 218. In the state in which the cleaning nozzle unit 254 has been mounted on the crossover rack 218, the cleaning nozzles 262, 264 and 266 extend through their corresponding through-holes so that the cleaning nozzles 262, 264 and 266 are held in their respective, suitable, predetermined positions.

In order to detach the cleaning nozzle unit 254 from the crossover rack 218, it is further necessary to separate the L-shaped pipe 260 and the piping 282 from each other. In accordance with a connecting structure for the piping 282, fluid passes through the plunging cylindrical portion 278 of the connecting pipe 274 from the piping 282 so as to enter into the seal pipe 284 from which the fluid is fed under pressure to the L-shaped pipe 260.

The fluid exerts internal pressure on the seal pipe 284 and hence the expansions 288 and 290 of the seal pipe 284 increase in diameter due to the internal pressure. As a result, the expansions 288 and 290 press against the inner peripheral surface of the cylindrical body 276 of the connecting pipe 274 to thereby achieve liquid-tightness between the seal pipe 284 and the connecting pipe 274. The higher the pressure of the fluid fed under pressure, the more the internal pressure of the seal pipe 284 increases, thereby raising the liquid-tightness therebetween.

On the other hand, when the feeding of the fluid to the L-shaped pipe 260 under pressure is stopped so as to reduce the internal pressure in the seal pipe 284, the force for pressing the expansions 288 and 290 against the cylindrical body 276 under pressure is reduced or eliminated. Therefore, the seal pipe 284 can be easily withdrawn from within the cylindrical body 276 and inserted into the cylindrical body 276. Accordingly, the piping 282 can be easily separated from and connected to the L-shaped pipe 260.

Thus, the liquid-tightness between the seal pipe 284 and the connecting pipe 274 can be ensured upon connecting the piping 282 to the L-shaped pipe 260. Simultaneously, the separation and connection between the piping 282 and the L-shaped pipe 260 can be made easy.

When the connecting structure for the piping between the cleaning nozzles 262, 264 and 266 fit in the crossover rack 218 and the washing water replenishing tank 354 is used, the liquid-tightness between the seal pipe and the connecting pipe, which is capable of bearing a corresponding pressure necessary to clean the out-of-liquid conveying portion, is ensured. Further, even when an attempt is made to maintain and check the cleaning nozzles 262, 264 and 266 or even when it is necessary to attach the crossover rack 218 to the cleaning nozzle unit 254 and detach it therefrom for the purpose of maintaining and checking the out-of-liquid conveying portion, the piping 282 and the L-shaped pipe 260 can be easily separated from and connected to each other.

Next, in accordance with the a seal structure, the rectangular portion 250 of the sealing member 248 is fit in the concave portion 246 which is rectangular in section and which is defined in the rack outer peripheral surface 59 of the rack cover 350 for the processing rack 58. Further, the sealing member 248 is mounted in the processing rack 58. The sealing member 248 is pressed against the inner peripheral surface 55 of the bath 54 in a state in which the processing rack 58 has been inserted into the bath 54 along one direction (vertical direction). Thus, the inner peripheral surface 55 of the bath 54 is sealed against the rack outer peripheral surface 59 of the rack cover 350 for the processing rack 58.

Since the sealing member 248 is fit on the rack outer peripheral surface 59 of the processing rack 58, the sealing member 248 can be mounted with extreme ease as compared with a case in which the sealing member is mounted on the inner peripheral surface of the bath.

Further, since the rectangular portion 250 is fit in the concave portion 246 is rectangular in section, the sealing member 248 is not rotated about its longitudinal direction and can be stably mounted on the rack outer peripheral surface 59. It is therefore possible to prevent the sealing member 248 from twisting and braking. The structure is particularly effective because the processing rack 58 is provided so as to be inserted into and withdrawn from the bath 54 along one direction.

Furthermore, owing to the integral formation of the projection 252 with the rectangular portion 250, the projection 252 can be flexibly pressed against the inner peripheral surface 55 of the bath 54. Since the processing rack 58 is provided so as to be inserted into and withdrawn from the bath 54 along one direction, the flexibility of the processing rack 54 is effective in particular.

Still further, according to the seal structure between the rack cover 350 provided at the upper portion of the processing rack 58 and the bath 54, the liquid-tightness between the outer peripheral portion of the processing rack 58 and the inner peripheral surface 55 of the bath 54 is achieved.

Thus, water can be prevented from evaporating from the processing solutions such as the developer, the bleaching/fixing solution or the like, thereby making it possible to maintain the concentration of the processing solution in a satisfactory state.

If the frequency with which the processing rack 58 is inserted into and withdrawn from the processing bath for purposes of maintenance and inspection or the like increases, the above-described operations and effects become extremely effective.

The present invention is not necessarily limited to the above embodiment. The aforementioned embodiment describes the processor unit of the printer-processor as an illustrative example. However, the processor unit is not necessarily limited to this example. For example, the processor unit may be independently provided. Further, the photosensitive material is by no means limited to the photographic paper. As an alternative, the photosensitive material may be a negative film or the like.

In the illustrated embodiment, the interlocking portion comprises the interlocking hole 275 and the interlocking/non-interlocking portion comprises the interlocking member 272. However, the interlocking portion and the interlocking/non-interlocking portion are not necessarily limited to these components and may be other means. Further, the number of cleaning nozzles and their positions are not necessarily limited to those employed in the aforementioned embodiment, can be set as needed.

In the illustrated embodiment as well, the lower end of the plunging cylindrical portion 278 is extended and the piping 282 is fit on and connected to the outer periphery of the extension thereof. However, the present embodiment is not necessarily limited to this construction. For example, the piping 282 can be also fit on and connected to the outer periphery of the cylindrical body 276, for example.

Further, the shape of each expansion of the seal pipe 284 may be set as needed without being necessarily limited to that employed in the aforementioned embodiment.

While the embodiment of the present invention, as herein disclosed, constitutes a preferred form, it is to be understood that other forms might be adopted.

What is claimed is:

1. A method of measuring a quantity of cleaning water, which is used in a cleaning structure for an out-of-liquid conveying portion, wherein a crossover rack accommodating therein the out-of-liquid conveying portion for conveying a photosensitive material in an out-of-liquid area is removably provided at an upper portion of a processing rack provided within a processing bath to convey a printed photosensitive material into a processing solution and process the photosensitive material in the processing solution, and cleaning nozzles are removably mounted to the crossover rack such that the cleaning water is expelled to an interior of the crossover rack through the cleaning nozzles, thereby cleaning the out-of-liquid conveying portion, said method comprising the steps of:

mounting, in place of the crossover rack, a measuring rack provided with a nozzle mounting portion having a closed bottom to the upper portion of the processing rack without providing said out-of-liquid conveying portion, said cleaning nozzle being attachable to and detachable from said nozzle mounting portion, and mounting said cleaning nozzles to said nozzle mounting portion;

thereafter expelling the cleaning water from the cleaning nozzles so as to store the cleaning water in said measuring rack; and thereafter removing said measuring rack from the upper portion of the processing rack so as to measure a quantity of the cleaning water stored in the processing rack.

2. A measuring rack for measuring a quantity of cleaning water, which is used in a cleaning structure for an out-of-liquid conveying portion, wherein a crossover rack accommodating therein the out-of-liquid conveying portion for conveying a photosensitive material in an out-of-liquid area is removably provided at an upper portion of a processing rack provided within a processing bath to convey a printed photosensitive material into a processing solution and process the photosensitive material in the processing solution, and cleaning nozzles are removably mounted to the crossover rack such that cleaning water is expelled to an interior inside of the crossover rack through the cleaning nozzles, thereby cleaning the out-of-liquid conveying portion, said measuring rack comprising:

a main body having a bottom, said main body being removably mounted, instead of the crossover rack, to the upper portion of the processing rack; and a nozzle mounting portion to which the cleaning nozzles may be attached and detached; said measuring rack being able to store the cleaning water expelled from the cleaning nozzles for measurement.

* * * * *